United States Patent Office 3,551,539
Patented Dec. 29, 1970

3,551,539
METHOD OF RETARDING SUBSTRATE SURFACE FOULING
James K. Clark, Wadsworth, and Larry H. Watters, Akron, Ohio, assignors to The Goodyear Tire & Rubber Company, Akron, Ohio, a corporation of Ohio
No Drawing. Filed Dec. 22, 1967, Ser. No. 692,637
Int. Cl. B29c *13/04;* B29d *7/02;* C08g *53/16*
U.S. Cl. 264—85                8 Claims

ABSTRACT OF THE DISCLOSURE

A method of retarding the fouling of a substrate surface where the substrate surface is exposed to at least one of the group consisting of amine compounds having primary amino groups, secondary amino groups and primary and secondary amino groups by exposing the substrate surface to at least one of the said amine compounds in an atmosphere substantially free of water and carbon dioxide therein the said atmosphere contains no more than 0.01 weight percent carbon dioxide.

---

This invention relates to a method of retarding the modification or fouling of a substrate where the modification or fouling of the substrate is caused by its exposure to compounds containing primary and secondary amino groups.

Various materials can be molded on substrates to form molded articles. However, it is known that various materials when molded on a substrate can modify or foul the surface of the substrate to inhibit the ability of the surface to release the molded articles. For example, it was observed that when polyurethane reaction mixtures prepared from reactive hydrogen-containing polymeric materials, organic polyisocyanates, and polyamine compounds are cast on a substrate surface and cured to form molded articles, the surface of the substrate can become modified or fouled so that the ability of the substrate or mold surface to release the molded articles is inhibited and also the surface definition of the mold is reduced. (The term "surface definition" used in this specification refers to the distinctness and sharpness of an outline of a surface.) Thus, in a molding operation, as successive molded articles are formed from the same mold, the mold surface is progressively modified or fouled and subsequent successive molded articles are more difficult to release from the mold surface, and the mold surface imparts progressively inferior decorative definitions to the surface of the resulting molded articles. As the mold surface becomes progressively modified or fouled, eventually a molded article becomes sufficiently adhered to the mold surface that it cannot be removed from the mold without destroying a portion of the mold or molded article.

We have now found that such substrate surfaces have been fouled when the substrate surface was exposed in the presence of atmospheric water and carbon dioxide to compounds containing primary and secondary amino groups. The said compounds having primary and secondary amino groups are characterized by the test which comprises forming one liter of a solution containing from about 10 to about 20 parts by weight of the compound per 100 parts by weight of methyl ethyl ketone, aging the solution for 8 hours at 25° C., warming the solution to 40° C. and passing gaseous carbon dioxide at about 25° C. through the solution at a rate of about one gaseous liter per minute to form a turbidity in the solution within 60 minutes.

Representative of the various compounds having primary and secondary amino groups are aliphatic and aromatic amines and diamines having primary amino groups, secondary amino groups and primary and secondary amino groups, and particularly compounds referred to in this specification as substituted methyl amine compounds. Representative of the substituted methyl amine compounds are those having the structure of the Formula 1:

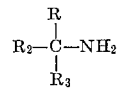

where $R_1$, $R_2$ and $R_3$ are individually selected from the group consisting of (a) hydrogen radicals, alkyl, cycloalkyl, aryl, alkaryl, and aralkyl radicals. Representative of such radicals are alkyl radicals having from one to forty carbon atoms such as methyl, ethyl, propyl, isopropyl, butyl, isobutyl, amyl, isoamyl, hexyl, isohexyl, heptyl, octyl, duodecyl, and tetracontyl radicals; cycloalkyl radicals such as cyclobutane, cyclopentane, cyclohexane, cycloheptane and cyclooctane; aryl radicals such as phenyl and naphthyl radicals; alkaryl radicals such as tolyl and xylyl radicals, and aralkyl radicals such as benzyl radicals; and (b) substituted alkyl, cycloalkyl, aryl, alkaryl, and aralkyl radicals where the substituents are selected from at least one of the group consisting of nitrogen, hydrogen, carbon, oxygen, sulfur, fluorine, chlorine, bromine, iodine, and phosphorus. Representative examples of such substituted radicals are amino radicals, imino radicals, and radicals containing amino groups, imino groups, halo groups, ether groups, and thioether groups.

Particularly representative substituted methyl amines are primary diamines having their amino groups attached to nonbenzenoid carbon atoms which produce turbidity in the hereinbefore described test.

Further representative examples of the said substituted methyl amine compounds are compounds prepared by the method which comprises reacting the substituted methyl amine compound of Formula 1 with an aldehyde or ketone. Various aldehydes can be used, representative of which are formaldehyde, acetaldehyde, propionaldehyde and benzaldehyde. Various ketones can be used representative of which are acetone, methyl ethyl ketone, methyl isobutyl ketone, diisobutyl ketone, methyl n-amyl ketone, methyl-i-amyl ketone and acetophenone. These compounds are generally called aldimines and ketimines.

Representative examples of the various substituted methyl amine compounds are ethylene diamine, hexamethylene diamine and dimethyl hexamethylene diamine; isophorone diamine, 1,4-cyclohexane bis methyl amine, 4,4'-diamino-dicyclohexyl methane, meta xylene diamine, paraxylene diamine, tetrachloroparaxylene diamine, cyclobutane-1,2 bis methylamine, menthane diamine, imino bis propoylamine, bis(amino propyl) piperazine, diethylene triamine, triethylene tetramine, and triethylene pentamine.

Because the substrate surface, when it is so modified or fouled, can have a substantially reduced ability to release molded articles, it is therefore an object of this invention to provide a method of retarding or preventing such fouling of the substrate surface where the said substrate surface is exposed to the compounds having amino groups and particularly to the substituted methyl amine compounds.

Although the theory of the substrate surface modification is not thoroughly understood, our finding discloses the fouling to be in the nature of a deposit adhered to the surface of a substrate. The deposit, for example, can be adhered to the surface of an impermeable substrate surface and the deposit can be adhered to the surface and within the pores of a surface of a permeable substrate surface. The problem of the substrate surface fouling is particularly evident when pores of a mold surface become so fouled. Accordingly, when the deposits form within the pores of a mold they can bond to and be reactive with various molding materials, such as a polyurethane reaction mixture when cured, and thus cause the molded articles to adhere to the mold surface. If such a mold surface is a flexible polymeric materials, the deposits can continue to form and build up in its pores and cause the surface of the mold to deform, thereby producing an inferior decorative surface definition to the molded article.

In accordance with this invention it has been found that a method of retarding the fouling of a substrate surface where the substrate surface is exposed to or contacted with at least one of the group consisting of amine compounds having primary amino groups, secondary amino groups, and primary and secondary amino groups, comprises exposing the substrate surface to at least one of the said amine compounds in an atmosphere substantially free of carbon dioxide. If desired, such an atmosphere can be prepared by treating an atmosphere which contains carbon dioxide such as air to substantially remove the carbon dioxide. In the practice of this invention an atmosphere which is substantially free of carbon dioxide contains from about zero up to about 0.01 weight percent and preferably from about zero up to about 0.0005 weight percent carbon dioxide measured on a dry atmosphere basis. A desirable practical atmosphere for this invention contains from about zero or about 0.0005 up to about 0.005 weight percent carbon dioxide. In the practice of this invention generally the lower the concentration of carbon dioxide in the atmosphere, the more the fouling of the substrate surface is retarded or prevented.

In the practice of this invention, various methods can be used to provide an atmosphere substantially free of carbon dioxide and are well known to those skilled in the art. For example, an atmosphere such as air which normally contains from about 0.03 to about 0.04 percent by weight of carbon dioxide measured on a dry air basis can be treated to reduce its carbon dioxide content to at least 0.005 percent by weight and preferably to at least .0005 percent by weight such as by subjecting the atmosphere to reduced temperatures to condense its carbon dioxide and by treating the atmosphere with aqueous alkaline solutions such as potassium carbonate, sodium carbonate, potassium hydroxide, sodium hydroxide solutions and with aqueous organic amine solutions such as ethanolamine solutions. Also, an atmosphere which contains carbon dioxide can be purged with gases which are essentially free of carbon dioxide to substantially reduce the carbon dioxide content of the atmosphere to the preferred levels. If desired, various combinations of these methods can be used which will occur to those skilled in the art.

The method of this invention for preventing the fouling of the substrate surface can be practiced with a wide range of substrate surfaces. Where the substrate surface is to be used for molding articles it is preferred that the substrate is not chemically reactive with the compounds used to prepare the molded articles and that it will not tightly adhere to the molded articles. For example, if the molded articles are to be of an epoxy compound or of polyurethane, it is usually desired that the substrate will not tightly adhere to an epoxy compound or to a polyurethane when cured. Substrates for this purpose can have surfaces of materials known to those skilled in the art which do not tightly adhere to molded epoxy compounds and polyurethanes such as polyethylene, polypropylene and silicone rubber or the substrates can be made of these materials or other materials which have a surface coated with various suitable release agents and parting films also known to those skilled in the art.

A wide range of other substrate surfaces can be used, representative examples of which include the various solid metals and their alloys, cured millable gum silicone rubbers, cured natural rubber and rubber-like polymers, thermoplastic polymeric materials and thermoset plastic materials. If such substrates are used to mold various articles, they can be coated with various release agents known to those skilled in the art.

Most, if not all, of the substrate materials have pores in their surfaces and therefore are permeable to some degree. Representative examples of some of the various metals are aluminum, iron and their alloys. Representative of the various rubber-like polymers are rubbery polyurethanes and rubbery cured polymers and copolymers such as rubbery polymers of conjugated dienes including polybutadiene, polyisoprene, chloroprene, copolymers of butadiene and isoprene which contain a major portion of butadiene, particularly copolymers of butadiene and styrene of the hot and cold SBR type which contain from about 60 to about 90 percent by weight of butadiene, copolymers of butadiene and acrylonitrile, butyl rubber, which is a polymerization product of a major portion of a monoolefin such as isobutylene and a minor portion of a diolefin such as butadiene or isoprene copolymers of ethylene and propylene, and terpolymers of ethylene, propylene and a diene. Representative of the various thermoplastic and thermoset polymers are the polyurethanes, the various epoxide resins and epoxide varnishes, polymeric polyesters and polymers formed by the open ring polymerization of unsaturated alicyclic compounds having from one through three carbon-to-carbon double bonds in the alicyclic ring such as polyoctenamers and polydodecenamers.

Representative of the various release agents for the substrate surfaces are those that do not adhere to the epoxy compounds and polyurethanes and which do not react with polyurethane reactants and epoxy compounds to reduce the flexibility, tear, tensile strength and cold temperature properties of cured polyurethane compositions and epoxy compounds. Any of the many releasing agents or parting agents known to those skilled in the art to be useful in preparing epoxy and polyurethane castings may be used in this invention provided they meet the above requirements.

Some of the many suitable release agents include the polyethylene and polypropylene waxes and emulsions, natural waxes, synthetic waxes, dimethyl silicone fluids, greases, and higher polymers, soya bean fatty acid types or vegetable cephalin and lecithin, soaps, fluorocarbons, polyvinyl alcohol and fluorosilicones.

In the practice of this invention, it has been found that even if a substrate is coated with a release agent, when the release agent coating is contacted in the presence of water and carbon dioxide with the substituted methyl amine compounds, the release agent coating can apparently be penetrated and the surface of the substrate can still become fouled by the formation of the deposits on the surface and within the pores of the substrate.

As hereinbefore described, this invention is particularly useful when practiced to retard or prevent fouling of silicone rubber substrate surfaces. Silicone rubbers are a class of materials well known to those skilled in the art as rubbery cured poly(organosiloxanes). The silicone rubbers are particularly suitable substrates for molding epoxy and polyurethane articles because they can form flexible substrates which do not tightly adhere to such articles after the articles are molded. Such substrates may be produced by curing room temperature vulcanizing liquid silicone rubbers or millable gum silicone rubbers well known to those skilled in the art.

Representative of the room temperature vulcanizing liquid silicone rubbers are those described as organopolysiloxane compositions containing silicon-bonded hydroxyl groups which can be cured by metal salts of organic carboxylic acids, by quaternary ammonium compounds or by epoxide containing compounds in the presence of primary, secondary or tertiary amines.

In general, these silanol-containing organopolysiloxanes contain an average of from about 1.0 to 1.98 organic groups attached to silicon through silicon-carbon linkages, and contain an average of from 0.01 to 1 silicon-bonded hydroxyl groups per silicon atom. Alternatively, some of the silicon-bonded hydroxyl groups can be replaced with alkoxy groups or with pendant hydrogen atoms.

These compositions can be described as having the average formula (1) 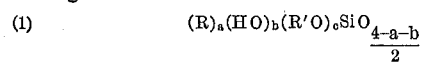

where R is a monovalent hydrocarbon radical or a substituted monovalent hydrocarbon radical, R' is an alkyl radical containing from 1 to 8 carbon atoms, $a$ has a value of from 1.0 to 1.98, $b$ have a value from 0.01 to 1, $c$ has a value of from 0 to 0.99, the sum of $b+c$ is from 0.01 to 1, and the sum of $a+b+c$ is from 1.01 to 2.1. Included among the radicals represented by R are, for example, alkyl radicals, e.g., methyl, ethyl, propyl, butyl, octyl, decyl, etc. radicals; aryl radicals, e.g., phenyl naphtyhl, xylyl, tolyl, etc. radicals; aralkyl radicals, e.g., benzyl, phenyl-ethyl, styryl, etc. radicals; alkenyl radicals, e.g., vinyl, allyl, etc., radicals; cycloaliphatic hydrocarbon radicals, e.g., cyclohexyl, cycloheptyl, cyclohexenyl, etc. radicals; cyanoalkyl radicals, e.g., cyanoethyl, cyanomethyl, cyanopropyl, etc., radicals; halogenated monovalent hydrocarbon radicals, e.g., chloromethyl, bromomethyl, chloroethyl, chlorophenyl, tetrachlorophenyl and dibromophenyl radicals.

Representative of the millable silicone rubber gums are those described as: organo-substituted polysiloxanes, commonly called dialkyl or alkyl-aryl polysiloxane gums. The substituted groups are usually at least 50 percent in number methyl groups. The remainder of the groups are usually methyl or methyl with 5 to 20 percent phenyl or methyl with phenyl and vinyl, or methyl, vinyl or cyanopropyl groups, methyl vinyl and ethyl groups, or methyl and trifluoropropyl groups. The millable silicone rubber gums can be shown by the empirical formula

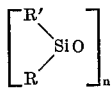

where R and R' are selected from the class consisting of the methyl and ethyl groups, the halogen and nitrile substituted alkyl groups containing from 1 to 4 carbon atoms, phenyl, halogenated phenyl, vinyl and cyclohexenyl groups and $n$ is a large number. R and R' may, if desired, be predominately or entirely methyl groups.

The millable gum silicone rubbers are generally cured by reacting the poly(organosiloxane) with a peroxide such as 2,4-dichlorobenzoyl peroxide, di-(tertiarybutyl)perbenzoate, tertiarybutyl perbenzoate, benzoyl peroxide or dicumyl peroxide. Usually about from 0.5 to 15 and preferably 1.0 to 3.0 parts of curing agent per 100 parts by weight of silicone rubber are used, depending on the percentage of unsaturated substitution present.

Various fillers can be added to the silicone rubber before curing, typical of which are, for example, fume silicas, silica aerojels, organo-silane modified silicas, barium and cadmium titanates, zirconates and stannates; diatomaceous earth, clays, calcium carbonate, finely ground quartz, barites, iron oxide, zinc oxide, titanium dioxide and mixtures thereof.

The cured silicone rubbers have various physical properties. For example, they may have tensile strengths from about 100 to about 1000 pounds per square inch, elongations of from about 100 to 600 percent and Durometer hardness, Shore A scale of from about 20 to about 60.

When molded polyurethane articles are prepared by applying a polyurethane reaction mixture containing at least one of the compounds having amino groups and particularly the substituted methyl amine compounds to a substrate mold surface in the presence of atmospheric water and carbon dioxide, curing the reaction mixture and removing the molded polyurethane article from the mold, the substrate surface can become progressively fouled and adhere to successive molded articles. Diamines having amino groups attached to nonbenzenoid carbon atoms are used as curatives or chain extenders for polyurethanes and therefore are commonly used to form polyurethane reaction mixtures.

Thus, in the practice of this invention, a method of retarding fouling of substrate mold surfaces, where the substrate mold surface is fouled by contacting the substrate surface with the polyurethane reaction mixture containing at least one of the amine compounds, curing the reaction mixture, and removing the resulting cured polyurethane article from the substrate surface, comprises contacting the substrate surface with the polyurethane reaction mixture in an atmosphere substantially free of carbon dioxide.

Representative of the polyurethane reaction mixtures which can be used in the practice of this invention to prepare mold substrate surfaces and which can be used to prepare molded articles on substrate surfaces are those prepared from a reactive hydrogen-containing polymeric material, an organic polyisocyanate and at least one of the substituted methyl amines which are diamines having amino groups attached to nonbenzenoid carbon atoms. It is to be understood that the polyurethanes referred to in this specification may also contain polyurea linkages. Usually a solvent is added to the reaction mixture so that it will be in the form of a fluid mixture or solution. Generally, a sufficient solvent is added to form a solution containing from about 30 to about 65 percent solids. However, a higher or lower concentration of solids can be used, depending upon the reactants used and upon the intended use of the solution.

The reactive hydrogen-containing polymeric material used comprises at least one member selected from the group consisting of polyester polyols, polyesteramides, polyether polyols, castor oil and hydroxyl containing polymeric polyols having a hydroxyl functionality of from about 2 to about 3. The reactive hydrogen-containing material generally used has a molecular weight between about 700 and about 5000 and, usually, between about 1000 and about 3000. Generally the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethanes used in this invention can be prepared by polymerizing or copolymerizing alkylene oxides such as ethylene oxide, propylene oxides, and butylene oxides, by polymerizing or copolymerizing the low-molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Representative examples of hydroxyl containing polymeric polyols are polymeric polyols comprising from about 70 to about 100 percent units derived from conjugated dienes selected from the group consisting of 1,3-butadiene and isoprene and up to about 30 percent units derived from styrene. Preferably the polymeric polyols have a hydroxyl functionality of from about 2.1 to about 2.8.

Polyesteramides may be prepared by reacting a diamine, a glycol, and a dicarboxylic acid under conditions which will remove the water of condensation. Representative glycols and dicarboxylic acids useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyl diamine, phenylene diamine, methylene dianiline, toluidine diamine, dichlorobenzidine, and methylene-bis-chloroaniline.

The organic polyisocyanates used to prepare the polyurethanes include various organic diisocyanates and mixtures thereof. Generally the organic diisocyanates are preferred. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis (cyclohexylisocyanate) and 1,5-tetrahydronaphthalene diisocyanate, and mixtures of such diisocyanates. For the purpose of the present invention, the toluene - diisocyanates, diphenylmethane-4,4'-diisocyanate and 3,3'-dimethyl - 4,4' - bisphenylene diisocyanate, are generally preferred although the diisocyanates having isocyanato groups connected to nonbenzenoid carbon atoms are preferred where color retention is important.

The polyurethane polymers are usually prepared by forming a liquid polyurethane reaction mixture by reacting a reactive hydrogen-containing polymeric material with a polyisocyanate to form an isocyanate terminated polyurethane which is then mixed with the diamine. The reaction mixture is then cured to form the polyurethane polymer. The isocyanate terminated polyurethanes can be prepared by reacting the reactive hydrogen-containing polymeric material with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amino groups.

Other methods known to those skilled in the art of preparing polyurethanes with or without solvents being present may also be used.

Various nonreactive solvents known to those skilled in the polyurethane art can be used for the preparation of the prepolymer solutions and polyurethane reaction mixtures. Representative examples of the solvents are aromatic solvents such as benzene, xylene and toluene; and the liquid lower ketones such as acetone, methyl ethyl ketone, methyl isobutyl ketone, and diisobutyl ketone. If the polyurethane reaction mixtures of this invention are to be used to prepare the cured polyurethanes in confined areas which are subject to explosive hazards, nonflammable chlorinated solvents can be used to form nonflammable prepolymer solutions and polyurethane reaction mixtures. Representatives examples of such solvents are chloro-substituted olefins such as dichloroethylene, trichloroethylene, and 1,1,2,2-tetra-chloroethylene; and chloro-substituted saturated hydrocarbon compounds such as methyl chloroform, dichloromethane, 1,2-dichloroethane, trichloroethane, and 1,1,2,2-tetrachloroethane. Trichloroethylene is particularly useful. Mixtures of the solvents may be used to obtain satisfactory solubilities, rates of solution, spreading properties and evaporation rates, particularly when the polyurethane is to be used as a spray composition and applied to a suitable surface.

The isocyanate-terminated polyurethane, sometimes called a prepolymer, is usually dissolved or dispersed in the solvent to form a solution or dispersion which is then reacted with the diamine to form a cured polyurethane. The diamine curative is usually added to the isocyanate-terminated polyurethane in a ratio of from about 0.5/1 to about 1.5/1 and, preferably, about 0.8/1 to about 1.0/1 amine groups of the diamine for each isocyanate group in excess of the reactive hydrogen groups of the reactive hydrogen-containing polymeric material.

The following illustrative examples are set forth to further exemplify the objects and advantages of the invention. The parts and percentages are by weight unless otherwise indicated.

EXAMPLE I

A flexible silicone rubber mold was placed inside an oversized polyethylene bag having an inlet and an outlet. Gaseous nitrogen was continuously introduced into the polyethylene bag to purge the air containing carbon dioxide and allowed to continuously exit through the outlet of the polyethylene bag, at a sufficient rate to cause a small positive pressure to develop within the polyethylene bag. When the atmosphere within the polyethylene bag was sufficiently purged by the nitrogen to remove at least 99 percent of carbon dioxide present, a liquid polyurethane reaction mixture containing 4,4'-diamo-dicyclohexyl methane as a curative was cast in the mold and allowed to cure at about 25° C. for about 20 minutes. The cured polyurethane article did not tightly adhere to the surface of the silicone rubber mold and was easily released and removed from the silicone rubber surface. The cured molded polyurethane article had a surface gloss of 3.0 gloss units and accurately reproduced a negative surface definition of the mold surface. By this method an additional 100 cured molded polyurethane articles were prepared from the silicone rubber mold in the nitrogen atmosphere of the polyethylene bag. Each of the additional cured molded polyurethane articles had a surface gloss of about 3.0 gloss units and accurately reproduced a negative surface definition of the mold surface. The nitrogen atmosphere was then discontinued within the bag, thereby allowing carbon dioxide to mix with the nitrogen atmosphere. As several additional cured polyurethane articles were prepared in the mold by the same method, the mold surface became progressively fouled, the mold surface imparted progressively an inferior surface definition to the molded article with the surface gloss rapidly decreasing to about zero gloss units, and the molded polyurethane articles were progressively more difficult to remove from the mold surface.

The flexible silicone rubber mold for this example was prepared by casting a liquid room temperature vulcanizing silicone rubber over the surface of a shaped leather grained substrate. The silicone rubber was cured at about 25° C. for 8 hours and was easily removed from the leather grained substrate to form a flexible, self-releasing silicone rubber mold having an inner surface, the said inner surface being a negative reproduction of the leather grained surface of the said substrate. The mold of silicone rubber was then further post-cured for about 3 days at about 82° C. and for 8 hours at about 120° C. The inner surface of the silicone rubber mold had a gloss of 3.0 gloss units. The gloss was determined with a 60° glossmeter according to ASTM Method D523–66T.

The liquid room temperature curing silicone rubber used to prepare the flexible mold was prepared by mixing Components A and B of RTV 588 (obtained from the Dow Corning Co.), immediately prior to preparing the mold of silicone rubber. Component A comprised a mixture of a prepolymer, chain extender, stabilizers, oil and fillers. The prepolymer was a silanol terminated polyorganosiloxane, and the chain extender a polyalkoxy substituted polyorganosiloxane. Component B comprised dibutyl tin dilaurate catalyst, fillers and oils.

The polyurethane reaction mixture used in this example was prepared by mixing a polyurethane prepolymer solution with a diamine solution. The polyurethane prepolymer was prepared according to the following recipe at about 90° C. to about 150° C.

| Compound: | Parts by weight |
|---|---|
| Mixture of 1,4-butane diol adipates having an average molecular weight of about 1500 and an average hydroxyl number of about 84 | 54 |
| 4,4'-dicyclohexyl methane diisocyanate | 21.5 |
| Lacquer (a vinyl-acrylic copolymer used as a colorant pigment) | 10 |

The prepolymer was then dissolved in 50 parts of dichloromethane to which the small amount of lacquer had been added.

Just before application to the mold substrate, the polyurethane prepolymer was mixed at about 25° C. with about 17 parts of a curative solution which consisted of

| Compound: | Parts by weight |
|---|---|
| 4,4'-diamino-dicyclohexyl methane | 20 |
| Acetone | 80 |

Various other polyurethane reaction mixtures containing amine compound curatives where such amine compounds have primary and secondary amino groups can be used in this example with similar results. Representative examples of such mixtures are polyurethane reaction mixtures prepared with the hereinbefore described substituted methyl amines such as the diamines having amino groups attached to nonbenzenoid carbon atoms, where the ratio of amino groups to excess isocyanate groups is 0.9/1, and with a prepolymer such as:

PREPOLYMER A

A reaction product of 2 mols of tolylene diisocyanate with about 1 mol of a polyester having a molecular weight of from about 1000 to about 2000 formed by condensing an excess of ethylene glycol with adipic acid.

PREPOLYMER B

Same as Prepolymer A except that about 1.1 mols of the diisocyanate are reacted with the polyester.

PREPOLYMER C

Same as Prepolymer A except propylene glycol is used to produce the polyester instead of ethylene glycol.

PREPOLYMER D

Same as Prepolymer A except methylene diphenylene diisocyanate is used instead of toluene diisocyanate.

PREPOLYMER E

The same as Prepolymer C except methylene diphenylene diisocyanate is used instead of toluene diisocyanate.

PREPOLYMER F

The same as Prepolymer E except 4,4'-dicyclohexyl methane diisocyanate is used instead of toluene diisocyanate.

PREPOLYMER G

The reaction product of 2 mols of toluene diisocyanate with 1 mol of a polytetramethyleneether glycol having a molecular weight of about 3000.

PREPOLYMER H

The same as Prepolymer G except 4,4'-dicyclohexyl methane is used instead of toluene diisocyanate.

PREPOLYMER I

The reaction product of 2 mols of toluene diisocyanate with 1 mol of a polyester having a molecular weight of from about 1000 to about 1500 prepared by the condensation of adipic acid with an excess of a mixture consisting of 80 percent by weight ethylene glycol and 20 percent by weight propylene glycol.

The method of this invention has utility for molding articles on substrate surfaces where the molded articles are prepared from materials containing the compounds having primary and secondary amino groups. It has particular utility for preparing polyurethane articles such as industrial products, belts and cushioning elements having molded polyurethane coverings where the polyurethanes are prepared from liquid polyurethane reaction mixtures which contain diamines containing amino groups connected to nonbenzenoid carbon atoms.

While certain representative embodiments and details have been shown for the purpose of illustrating the invention, it will be apparent to those skilled in this art that various changes and modifications may be made therein without departing from the spirit or scope of the invention.

What is claimed is:

1. A method of retarding the fouling of a substrate surface where the substrate surface is exposed to a polyurethane reaction mixture containing at least one of the group consisting of diamines having primary amino groups, secondary amino groups and primary and secondary amino groups which comprises applying the said polyurethane reaction mixture onto the said substrate surface in an atmosphere substantially free of water and carbon dioxide, wherein the said atmosphere contains no more than 0.01 weight percent of carbon dioxide, curing the reaction mixture, and removing the resulting cured and molded polyurethane article from the substrate surface.

2. A method according to claim 1 wherein the said amine compounds are characterized by the test which comprises forming one liter of a solution containing from about 10 to about 20 parts by weight of the substituted methyl amine compound per 100 parts by weight of methyl ethyl ketone, aging the solution for 8 hours at 25° C., warming the solution to 40° C. and passing gaseous carbon dioxide at about 25° C. through the solution at a rate of about one gaseous liter per minute to form a turbidity in the solution within 60 minutes.

3. A method according to claim 2 wherein the amine compound is a substituted methyl amine compound selected from the group consisting of a compound having the structure (1) 

and a compound prepared by reacting a substituted methyl amine compound of (1) with a compound selected from the group consisting of an aldehyde and a ketone, where $R_1$, $R_2$ and $R_3$ are individually selected from the group consisting of (a) hydrogen radicals, alkyl, cycloalkyl, aryl, alkaryl, and aralkyl radicals, and (b) substituted alkyl, cycloalkyl, aryl, alkaryl, and aralkyl radicals where the substituents are selected from at least one of the group consisting of nitrogen, hydrogen, carbon, oxygen, sulfur, fluorine, chlorine, bromine, iodine, and phosphorous.

4. A method according to claim 3 wherein the said atmosphere contains no more than 0.01 weight percent carbon dioxide on a dry atmosphere basis.

5. A method according to claim 4 where the substituted methyl amine compound is a diamine having amino groups attached to nonbenzenoid carbon atoms.

6. A method according to claim 4 where the substituted methyl amine compound is selected from the group consisting of ethylene diamine, hexamethylene diamine and dimethyl hexamethylene diamine; isophorone diamine, 1,4-cyclohexane bis methylamine, 4,4'-diamino-dicyclohexyl methane, meta xylene diamine, paraxylene diamine, tetrachloroparaxylene diamine, cyclobutane-1,2 bis methylamine, menthane diamine, imino bis propylamine, bis (amino propyl) piperazine, diethylene triamine, triethylene tetramine, and tetraethylene pentamine.

7. A method according to claim 6 where the solid substrate surface is selected from at least one of the group consisting of polyethylene, polypropylene, silicone rubber, and release agent coated metals, cured millable gum silicone rubber, cured natural rubber, rubber-like polymers, thermoplastic polymeric materials, and thermoset polymeric materials.

8. A method according to claim 2 where the substrate surface is a silicone rubber, where the said atmosphere contains no more than 0.005 weight percent carbon dioxide and where the said polyurethane reaction mixture is a liquid polyurethane reaction mixture prepared from (a) at least one reactive hydrogen-containing polymeric material having a molecular weight between about 700 and about 5000 selected from the group consisting of polyester polyols, polyester amides, polyether polyols, dihydroxyl-terminated polymer of conjugated diene hydrocarbons, and castor oil, (b) at least one organic polyisocyanate, the overall molar ratio of the isocyanate groups of the polyisocyanate to the reactive hydrogens of the hydrogen-containing polymeric material being between about 1.1/1 and about 12/1, and (c) at least one diamine having amino groups attached to nonbenzenoid carbon atoms in a ratio of from about 0.5/1 to about 1.5/1 of amine groups to the isocyanate groups in excess of the reactive hydrogen-containing polymeric material.

References Cited

UNITED STATES PATENTS

| 2,935,372 | 5/1960 | Steuber | 264—85 |
| 3,127,457 | 3/1964 | Di Pinto | 264—54 |
| 3,211,701 | 10/1965 | Müller et al. | 260—75 |
| 3,341,646 | 9/1967 | Britain | 264—337 |
| 3,423,488 | 1/1969 | Bowser | 264—85 |
| 3,487,134 | 12/1969 | Burr | 264—226 |

FOREIGN PATENTS

| 920,272 | 3/1963 | Great Britain | 264—54 |

ROBERT F. WHITE, Primary Examiner

J. R. THURLOW, Assistant Examiner

U.S. Cl. X.R.

260—75, 77.5; 264—169, 226, 331